No. 648,337. Patented Apr. 24, 1900.
J. S. BENTZ.
COMBINED WATER STILL AND HEATER.
(Application filed May 22, 1899.)

(No Model.) 2 Sheets—Sheet 1.

Witnesses
Vivian Bradford
C. D. Kesler.

Inventor
Jason S. Bentz,
By his Attorneys
Finckel & Finckel.

THE NORRIS PETERS CO., PHOTO-LITHO., WASHINGTON, D. C.

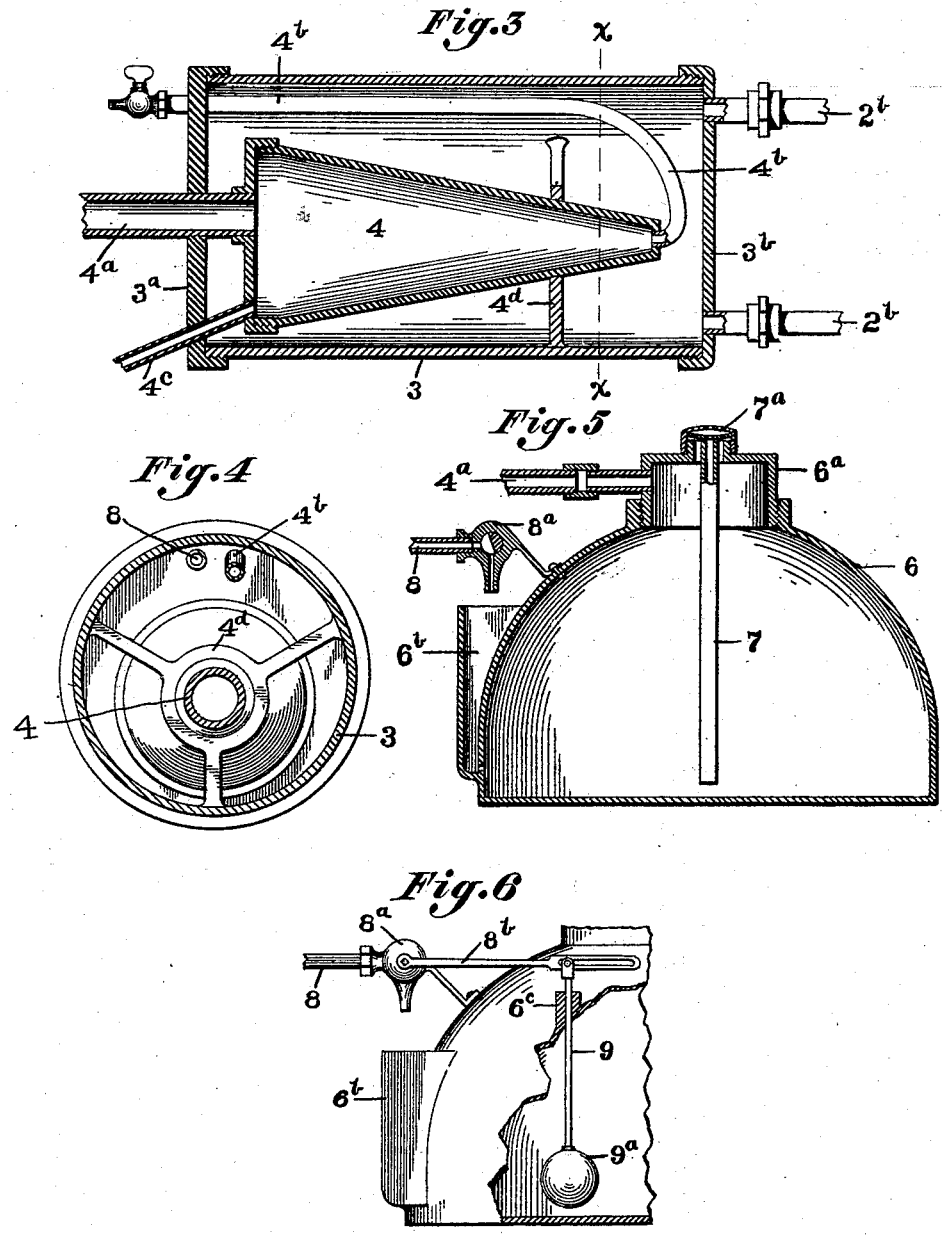

UNITED STATES PATENT OFFICE.

JASON S. BENTZ, OF COLUMBUS, OHIO.

COMBINED WATER STILL AND HEATER.

SPECIFICATION forming part of Letters Patent No. 648,337, dated April 24, 1900.

Application filed May 22, 1899. Serial No. 717,791. (No model.)

*To all whom it may concern:*

Be it known that I, JASON S. BENTZ, a citizen of the United States, residing at Columbus, in the county of Franklin and State of Ohio, have invented certain new and useful Improvements in a Combined Water Still and Heater; and I do hereby declare the following to be a full, clear, and exact description of the invention, such as will enable others skilled in the art to which it appertains to make and use the same.

The stills for furnishing water for domestic purposes as now sold in the market are wasteful of fuel. Moreover, they are troublesome in use, because in order to supply the condenser with water sufficiently cool to effectually condense all the steam generated it must be frequently emptied and replenished from a pail or pitcher. Further, these stills require unremitting attention to prevent them from boiling dry and a consequent burning or melting down of the apparatus.

The prime object of my invention, therefore, is to provide an improved apparatus for distilling water for domestic uses that may be connected with the ordinary stand-boiler, so that water for bathing or kitchen purposes may be heated during the distilling process and in which water in the stand-boiler may be heated independently of any operation of the still.

A second object of my invention is to provide means for aerating to some extent the distilled water.

A third object of my invention is to provide means for automatically regulating the supply to the boiler and generator.

My invention consists in the construction hereinafter described and claimed.

Figure 1:
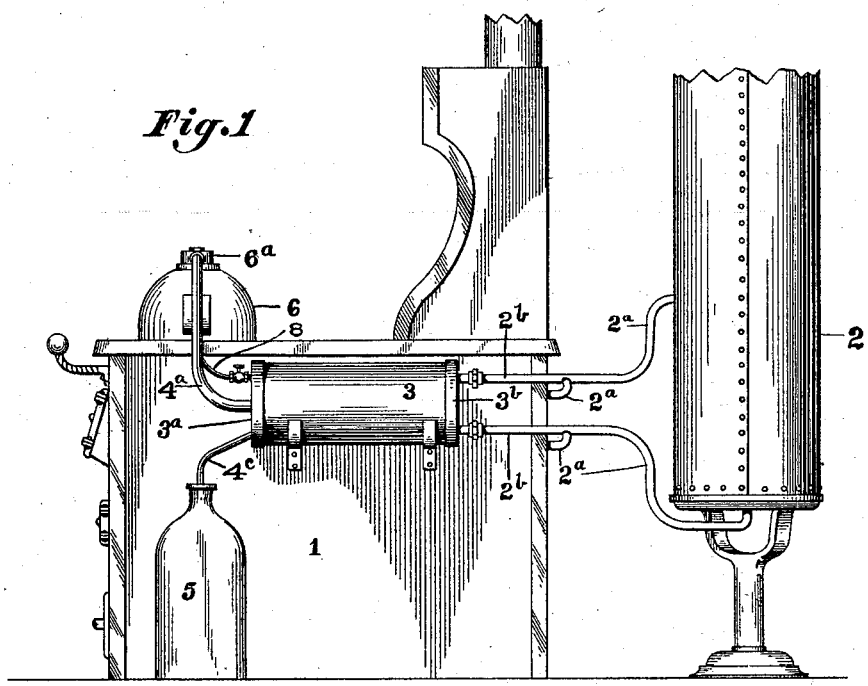
Figure 2:
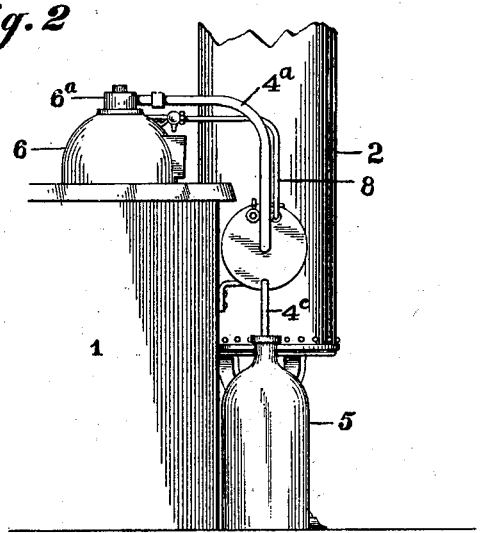

In the accompanying drawings, Figure 1 is a side view of a stove-range and stand-boiler, showing my distilling apparatus combined therewith. Fig. 2 is a front view of the same. Fig. 3 is a longitudinal sectional view of the condenser. Fig. 4 is a transverse sectional view of the condenser on the line $x\ x$, Fig. 3. Fig. 5 is a central sectional view of the generator, illustrating incidentally the low-water alarm. Fig. 6 is a detail illustrating the device for regulating the supply of water to the generator.

In the drawings like characters of reference designate corresponding parts.

1 designates the ordinary stove-range, which is furnished in its fire-box with an ordinary water-back. (Not shown, but well understood.) The fuel for this range is gas, natural or artificial, and independent burners are furnished for the openings at the top, the baking-oven, and the water-back, so that the burner for the water-back need not be lighted when the still is to be operated, and if it is desired to heat water in the stand-boiler without operating the still the burner for the water-back is to be lighted.

2 designates the ordinary stand-boiler, that is connected with the water-back of the range by pipes $2^a\ 2^a$, as usual, and is provided with pipes connecting it with the street-main and with discharge pipes and cocks, (not shown, but well understood,) so that the flow through the boiler may be established.

3 designates the condenser, that is conveniently cylindrical in form and provided with heads $3^a$ and $3^b$, screwed into the opposite ends of the cylinder. Within the cylinder is a cone-shaped chamber 4, having a pipe $4^a$ connected with its large end passing through the head $3^a$, said pipe leading to the retort, and a pipe $4^b$ connected to its small end that is preferably bent around back toward the large end and passed through the head $3^a$, the protruding part of said pipe being provided with a cock, as shown. From the lower portion of the large end of the cone-shaped chamber there extends a pipe $4^c$, also passing through the head $3^a$, that conveys the water distilled in the chamber 4 to a suitable receptacle 5. Soldered or otherwise secured to the smaller end of the cone is a spider-frame $4^d$, the arms of which extend to and touch the inner sides of the cylinder and afford a brace or support for the small end of the cone, it being observed that the larger end is sufficiently supported by the pipes connecting it and the head $3^a$. From this construction it will be observed that the head $3^a$, with the cone and parts connecting the same, may be bodily removed and all the parts cleansed at any time necessary. The condenser is connected with the pipes $2^a\ 2^a$ by pipes $2^b\ 2^b$, preferably passing through the head $3^b$.

It will be observed that the condensing-cone is entirely surrounded by water when the cylinder is filled.

The generator 6 consists of a vessel having its body portion shaped somewhat like an ordinary kettle, but having a steam-dome 6ª screw-threaded in the top thereof and having means for detachably coupling therewith the pipe 4ª. Attached to the top of this dome 6ª is a tube 7, Fig. 5, at the upper end of which is a whistle 7ª, so that when the water becomes low in the generator the escaping steam will sound an alarm; but I have provided a device that will render the use of an alarm unnecessary. It consists of an automatic supply for the generator and means for automatically regulating that supply. Extending preferably from the upper portion of the head 3ª (because the water there after a short time will be more or less warmed) is a pipe 8, that is coupled to a cock 8ª, supported at the side of the generator over the upper end of a pocket or well 6ᵇ, that communicates at its lower end with the interior of the generator 6. The valve of the cock has fixed to it an arm 8ᵇ, slotted at its free end, to which is connected the upper end of a rod 9, that works vertically in a perforated bushing 6ᶜ at the top of the generator, and on the lower end of this rod is screwed a float 9ª, that rises and falls with the rise and fall of the level of the water in the generator. The rising and falling of the float closes and opens, respectively, the cock, and so automatically regulates the supply of water, thus rendering the operation of the apparatus perpetual, except for natural limitations.

From the foregoing it will be observed that the condenser becomes a permanent part of the apparatus of the kitchen and that in order to obtain distilled water it is only necessary to place the generator on the stove and make the proper connections with the condenser. The devices for automatically regulating the supply can be dispensed with, as may also the alarm. If the automatic supply is used, the alarm will seldom operate, and then only through some choking of the supply-pipe or failure of the float to operate.

The function of the pipe 4ᵇ, Fig. 3, is to serve first as a vent to allow the escape of such volatile gases as may arise in the initial heating and boiling of the water in the generator, and after this has taken place the pipe may be closed; but another important function of this pipe is to admit air to aerate the condensing steam and resultant water, relieving the extreme blandness of distilled water, to which some object; but I believe at present that the aeration of water is only practicable where the condensing capacity of the cone exceeds the generating capacity of the generator, and this may be more certainly effected by properly proportioning the condenser to the generator and constructing both the generator and condenser of such size that the ordinary stand-boiler shall contain a relatively large quantity of cold water. Ordinarily, however, abundant supply of distilled water for a day's use will be obtained before or by the time all the water in the stand-boiler has been heated by the operation of the still.

If the hot water required in the family happens to exceed that obtained by operating the still for the ordinary supply of distilled water, the surplus hot water may be secured by removing the generator from the stove and heating the water-back or the hot-water tank or stand-boiler in the ordinary way.

Aside from the extreme convenience of my apparatus, its economy will be appreciated when the quantity of fuel required to heat the water in the ordinary stand-boiler is calculated.

What I claim, and desire to secure by Letters Patent, is—

1. In combination with a closed tank having inlet and outlet pipes, the outlet-pipe having a stop-cock, said tank being adapted to contain water under pressure, a separate chamber connected by pipes and communicating with said tank, said separate chamber containing a condenser for condensing or distilling water whereby the water in said tank may be heated by the distilling process in said separate chamber and stored for use in said tank substantially as described.

2. In combination with a stove having a water-back, a closed tank for containing water under pressure communicating with said water-back and also having water-supply and outlet pipes, the outlet-pipe having a stop-cock, a separate chamber connected by pipes and communicating with said tank, said separate chamber containing a condenser for condensing or distilling water whereby the water in said tank may be heated and stored in said tank either from the water-back or from the condenser, substantially as described.

3. In a distilling apparatus a closed tank having inlet and outlet pipes, the outlet-pipe having a stop-cock, said tank being adapted to contain water under pressure, a separate chamber containing a condenser for condensing or distilling water whereby the water in said tank may be heated by the distilling process in said separate chamber and stored for use in said tank combined with a retort or boiler having a supply-pipe from said separate chamber, a valve in said supply-pipe, a float in said retort or boiler connected with said valve so as to operate the same upon its rise or fall to diminish or increase the flow from said pipe, substantially as described.

4. In a distilling apparatus a closed tank having inlet and outlet pipes, the outlet-pipe having a stop-cock, said tank being adapted to contain water under pressure, a separate cold-water chamber containing a condenser for condensing or distilling water whereby the water in said tank may be heated by the distilling process in said separate chamber and stored for use in said tank, said condenser having a steam-inlet pipe and an outlet for distilled or condensed water, and a supplementary pipe 4ᵇ connecting said condensing-chamber with the exterior of said cold-water chamber, substantially as described.

5. In a distilling apparatus, a cold-water chamber having a removable head 3ᵃ, a condensing-chamber having a steam-inlet pipe, a distilled-water outlet and a supplementary pipe 4ᵇ, all passing through said head and removable therewith, substantially as and for the purpose explained.

6. In a combined still and water-heater, a generator, a condenser, a closed water-reservoir to contain water under pressure, a pipe connecting the lower part of the reservoir with the condenser and a pipe connecting the condenser with the reservoir above the junction of the first-mentioned pipe whereby circulation of water from the reservoir to the condenser and back to the reservoir is obtained, substantially as described.

In testimony whereof I affix my signature in presence of two witnesses.

JASON S. BENTZ.

Wisnesses:
GEORGE M. FINCKEL,
GEORGE W. ALFRED.